United States Patent Office 2,915,499
Patented Dec. 1, 1959

2,915,499
COPOLYMERS OF BISPHENOLS AND 3,9-DI-ALKENYLSPIROBI-(M-DIOXANES)

Joseph E. Wilson, Highland Park, and Richard K. Walton, North Plainfield, N.J., assignors to Union Carbide Corporation, a corporation of New York No Drawing. Application December 27, 1956
Serial No. 630,741

7 Claims. (Cl. 260—47)

This invention relates to a new class of thermosetting resins derived from bisphenols.

The classic phenolic resins are based on condensation products of phenol and formaldehyde. Such resins are usually made in two stages; the first stage being a partially condensed resin which further polymerizes during the molding cycle to form the familiar molded articles of commerce. As gases are released during such molding cycles, high molding pressures are required. Also molded articles of phenolic resin are somewhat brittle and lacking in resistance to impact.

Another type of resin is derived from bisphenols, such as Bisphenol A (4,4'-dihydroxydiphenyldimethylmethane) by reaction with epichlorohydrin to form the corresponding glycidyl polyethers. Such epoxy compounds when cured with hardening agents, such as diethylene triamine, form a useful class of resins, which, however, have relatively low heat distortion points.

We have discovered a new class of resins derived from bisphenols which cure without the release of gases to form hard and tough polymers having high heat distortion points. According to this invention such polymers are made by condensing a bisphenol with an unsaturated acetal. The unsaturated acetals may be formed by the reaction of acrolein or substituted acroleins with pentaerythritol. Such unsaturated acetals may be represented by the formula:

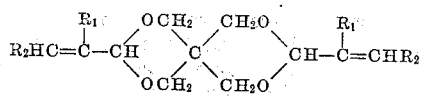

where $R_1$ is hydrogen, methyl or chlorine, and $R_2$ is hydrogen or methyl.

The unsaturated acetal from acrolein and pentaerythritol, termed diallylidene pentaerythritol or 3,9-divinylspirobi (m-dioxane) is known to enter into resinification reaction with polyhydric alcohols in the presence of acidic catalysts. Such reactions proceed by the sequential addition of the vinyl groups of the acetal to the hydroxyl groups of the polyhydric alcohols to form a polyether.

Unlike these known resins, the polymers of the present invention are not polyethers. Instead the bisphenols copolymerize with the vinyl groups of the acetals by means of the active hydrogen atoms of the bisphenols in the ortho and para positions. Thus, the polymerization mechanism of the present invention may be represented as follows:

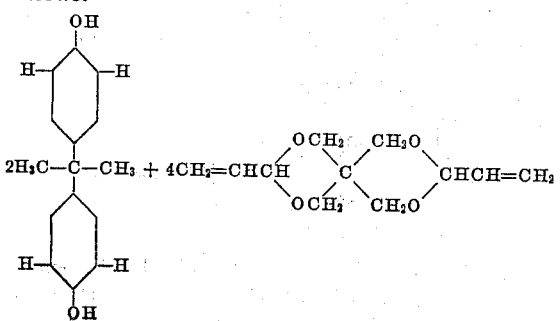

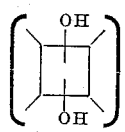

Bisphenol A   3,9-Divinylspirobi (m-dioxane)

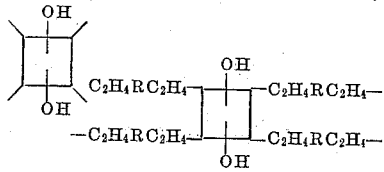

Cross-linked polymer

In Bisphenol A, there is no open para position, so that cross-linking occurs between the four ortho positions of the bisphenol by addition to the two vinyl groups of the unsaturated acetal.

It should be noted that the above mechanism suggests the addition of the bisphenol to the terminal carbon atoms of the vinyl group. It is possible, of course, that the addition follows the rule of Markownikoff whereby the bisphenol would add to the olefinic carbon atom having the fewest hydrogen atoms.

Regardless of the mechanism of the addition, all the available evidence indicates that the reaction between the bisphenols and the unsaturated acetals proceeds by the addition of the bisphenol at the reactive ortho and para positions to the vinyl group of the acetal.

In the first place, the spirobi acetal does react with bisphenol to form a three-dimensional, thermosetting polymer network, which indicates that bisphenol has a functionality greater than two. In the second place, the mode of reaction represented by Equation I indicates a stoichiometric reaction between one mole of bisphenol and two moles of the spirobi compound and it has been found experimentally that this is the optimum reactant ratio for the preparation of thermosetting polymers from these reactants. In the third place, it was shown by means of a suitable chemical test for phenolic hydroxyl groups that the concentration of phenolic hydroxyl remains substantially undiminished during the course of the reaction. The chemical test used involves the reaction of a phenol with diazotized sulfanilic acid to form an intensely colored orange solution. The color intensity is proportional to the concentration of phenolic hydroxyl present in the unknown.

A bisphenol suitable for the practice of the invention may be defined, as a compound containing two phenylol groups. Said phenylol groups may be substituted or unsubstituted and may be attached directly to each other or may be linked together through a polyvalent organic radical such as an alkylene or alkylidene group or the like or through a hetero-atom such as sulfur or phosphorus or the like. Bisphenol compounds (or mixtures) useful for copolymerization with dialkenylspirobi compounds should have a functionality greater than two, where functionality denotes the number (or average number) of reactive sites per molecule, i.e., the number (or average number) of unsubstituted phenolic ring positions located ortho or para to either of the phenolic hydroxyls. For example, the following bisphenols are suitable in the practice of the invention.

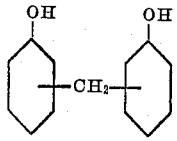

Dihydroxydiphenylmethane (any of the isomers, or mixtures thereof) in particular the 4, 4' isomer 1,2-bis-(p-hydroxyphenyl) ethane 2-hydroxy-5-methylphenyl-2'-methyl-4'-hydroxyphenyl methane 2,2-bis(p-hydroxyphenyl) propane Methylenebis-(3,5-xylenol)

Butylidenebisphenol

Thiobisphenol

Thiobis-(m-tert-butylphenol)

Dithiobisphenol

Bis-(p-Hydroxyphenyl)sulfone

Bis-(p-Hydroxyphenyl) benzene phosphonate

Mixtures comprising bisphenols such as those illustrated above as well as other bisphenols of lower functionality are also useful provided that said mixtures have an average functionality greater than two.

As indicated above, the maximum degree of cure is obtained when an equivalent weight of a bisphenol is reacted with an equivalent weight of the 3,9-dialkenyl-spirobi (m-dioxane). However useful cured resins can be obtained in reactant ratios varying from 0.25 to 4, and preferably from 0.75 to 1.25, equivalents of bisphenol per equivalent weight of the dialkenylspirobi (m-dioxane). The equivalent weight of a bisphenol is its molecular weight divided by its functionality as above defined, and the equivalent weight of the dialkenyl compound is one-half its molecular weight.

The resinification reaction between the bisphenols and the alkenylspirobi (m-dioxane) is catalyzed by acids or acid-reacting substances. Effective catalysts include strong acids, such as toluenesulfonic, benzenesulfonic or sulfuric acids; and acid-reacting materials, such as diethyl sulfate. Less effective catalysts include weaker acids, such as phosphoric acid and Lewis acids (electron accepting compounds) such as aluminum chloride, stannic chloride, zinc chloride, ferric chloride or titanium tetrachloride. As little as 0.1% acid, based on both reactants, will catalyze the initial reaction between the bisphenol and the unsaturated acetal. However, the curing or hardening of the resin is accelerated by higher acid concentrations, of around 0.3%. Thus, the amount of acid may be varied, and suitable amounts include the range of from 0.01% to 2%.

Reaction between the bisphenols and the unsaturated acetals may be initiated by simply mixing the reactants and catalysts and heating. Reaction temperatures may be 50° C. to 150° C., with the reaction time varying from about one hour at the lower temperature to a few minutes at the higher temperature. If desired, an inert diluent, such as an ether or a hydrocarbon may be used to facilitate handling the reaction mixture.

The initial reaction product, after removal of any inert diluent, is a heat-hardenable, fusible material which may be either a viscous liquid or a low melting solid. If allowed to stand at room temperature without neutralization of the catalyst, the initial reaction product will eventually form a hard polymer. The curing reaction, therefore, is accelerated by heating; a few hours being required at 70° C., and a few minutes at 150° C. The physical properties of the polymer, such as the heat distortion values, are improved by curing at the higher temperatures. Usually, therefore, the curing temperature will be higher than the initial reaction temperature. If the catalyst is neutralized with a base, such as sodium carbonate, calcium carbonate or sodium acetate, the resin will remain in the fusible state on standing. The neutralized fusible resins may be cured by adding additional acid and heating in the same manner. As previously noted, no gases are released during the curing cycle.

In addition to the 3,9-divinylspirobi (m-dioxane), which is preferred, the following unsaturated acetals may also be used.

3,9-diisopropenylspirobi (m-dioxane)

3,9-dipropenylspirobi (m-dioxane)

3,9-bis(1-chlorovinyl) spirobi (m-dioxane)

The cured resins from bisphenols and 3,9-divinyl-spirobi (m-dioxane) are light-colored and transparent.

After curing, the resins are thermoset and show little, if any, thermoplasticity at 150° C. Shrinkage, on molding, is low and the molded piece are tough, impact-resistant and easy to machine. If cured in contact with glass, a good resin to glass bond is obtained.

Such copolymers of the dialkenylspirobi (m-dioxane) and bisphenols are useful in shell molding and as a binder for abrasive particles in making grinding wheels. Their adherence to glass indicates utility in making laminates from glass fiber and glass fabric. The fact that no water or other volatile by-product is liberated during curing gives the copolymers of this invention a decided advantage over conventional phenolic resins in potting, encapsulating and casting applications. In general, these new resins can be used in many of the applications now served by conventional phenolic, epoxy or polyester resins. The electrical properties of the new copolymers are superior to those of conventional unfilled phenolic resins, and are superior in some respects to electrical grade mica-filled phenolics.

Immersion tests on the new resins show that they have good resistance to attack by a variety of corrosive chemicals.

The new copolymers are particularly valuable as molding compositions, and the fact that they release no gases and fumes in molding give them a pronounced advantage over the conventional novolac resin cured with hexamethylenetetramine, enabling low pressure mo'ding techniques to be employed and insuring the formation of bubble-free molded articles. Various fillers, such as wood flour, diatomaceous earth and asbestos may be used. Also, in such applications, particularly where iron, aluminum or other metal fillers are employed, it is desirable to mix in the composition catalysts of a special type, which releases its acid at molding temperatures. In this manner stable molding compositions may be prepared. Such catalysts are the dialkyl sulfates, such as dimethyl, diethyl, diisopropyl and di-secondary butyl sulfates. These catalysts decompose at molding temperature to release sulfuric acid which is the active catalyst.

The cured resins from bisphenols and the dialkenylspirobi (m-dioxanes) have outstanding heat distortion points in the range 140° C. to 160° C. This is much higher than similar polymers derived from monohydric phenols. These heat distortion points are also higher than those of epoxy resins derived from the same bisphenols and cured with diethylene triamine.

If desired, the flexibility and impact strength of the bisphenols-divinyl acetal copolymers may be increased by adding an amount of a polyol to the reaction mixture up to an equal amount by weight of the bisphenol. Such polyols enter into the polymer being formed by reaction with the free vinyl groups of the acetal or of the growing polymer molecule to form ether linkages. This mode of addition is different from that of the bisphenols, as previously explained. The polyols which are useful in forming the copolymers of this invention include any of the aliphatic polyhydric alcohols, such as ethylene glycol, propylene glycol, glycerol, polyethylene and polypropylene glycols, 1,2,4-butanetriol, butylene glycol, pentamethylene glycol, hexanediol-1,6, 2-ethylhexanediol-1,3, pentaerythritol, trimethylolethane and trimethylolpropane.

The following examples will serve to illustrate the invention:

EXAMPLE I 42.2 grams (0.2 mole) of 3,9-divinylspirobi (m-dioxane) were reacted with 22.8 grams (0.1 mole) of Bisphenol A plus 0.21 gram (0.32 percent) of p-toluenesulfonic acid monohydrate as a catalyst on the steam bath for 15 minutes at 80° C. A sample of the reaction product was cast in a round tin box and cured for 60 minutes in an oven at 150° C. The cured material was hard and solid at 150° C., transparent and light amber in color. It was lighter in color than similar polymers prepared from phenol plus the spirobi compound. Its specific gravity was only 1.207. The Barcol Hardness was 35.

EXAMPLE II

A copolymer was prepared from the following components:

| | Grams |
|---|---|
| 3,9-divinylspirobi (m-dioxane) (0.4 mole) | 85 |
| Bisphenol "A" (0.2 mole) | 46 |
| Phosphoric acid | 0.366 |

The Bisphenol "A" was heated to 130° C. in a reaction flask and about ¾ of the 3,9-divinylspirobi (m-dioxane) was added. The molten mixture was then cooled to 80° C. and the remaining 3,9-divinylspirobi (m-dioxane) and the phosphoric acid was added. After a few minutes at 80° C. the resin was poured into molds and cured at 150° C. for several hours. Evaluation of the polymer gave these results:

| | |
|---|---|
| Heat distortion °C | 143 |
| Flexural modulus p.s.i. | 439,000 |
| Impact-izod (ft.-lbs. per in. of notch) | 0.3 |
| Hardness-Durometer "D" | 89 |

EXAMPLE III

A copolymer was prepared from 22.8 grams (0.1 mole) of Bisphenol "A," 10.4 grams (0.1 mole) of pentamethylene glycol and 63.6 grams (0.3 mole) of 3,9-divinylspirobi (m-dioxane) in the presence of 0.288 gram (0.29 percent) of p-toluenesulfonic acid monohydrate as a catalyst. The Bisphenol A was melted on a hot plate and the other ingredients were stirred in one at a time. The gel time of the resulting resin was 277 seconds at 150° C. Samples were cast and cured for 10 minutes at 150° C. They were fairly hard at 150° C., dark amber and transparent. The specific gravity of the material was 1.209. Seven-day immersion tests at room temperature gave a weight gain of 1.03 percent in water, 0.72 percent in one percent sodium hydroxide and 0.25 percent in 30 percent sulfuric acid. The Barcol Hardness of the product was 36. Electrical properties of the cured material (material A in Table I) were superior to those of unfilled phenolic resin compositions and equal or superior to those of mica-filled phenolic resin compositions.

*Table I*

| Resin | 60 Cycles | | 1 Kilocycle | | 1 Megacycle | | Volume Resistivity (Megohm-cm.) |
|---|---|---|---|---|---|---|---|
| | P. F. | D. C. | P. F. | D. C. | P. F. | D. C. | |
| Typical unfilled phenolics | 0.06–0.1 | 5–6.5 | 0.03–0.08 | 4.5–6 | 0.015–0.03 | 4.5–5 | $10^5$–$10^6$ |
| Matl. A | 0.00234 | 3.65 | 0.00308 | 3.58 | 0.0212 | 3.33 | 9.69×$10^9$ |
| Mica-Filled phenolics | 0.01–0.03 | 4.7–5.5 | 0.007–0.02 | 4.5–5.5 | 0.008–0.02 | 04.2–5.2 | $10^8$–$10^9$ |

EXAMPLE IV

A copolymer was prepared from the following components:

| | Grams |
|---|---|
| 3,9-divinylspirobi (m-dioxane) (0.4 mole) | 86 |
| Bisphenol "A" (0.2 mole) | 46 |
| Diethyl sulfate | 0.133 |

The Bisphenol "A" was charged to a reaction flask and heated to 140° C. to melt it. About ¾ of the 3,9-divinylspirobi (m-dioxane) was then added and the mixture was cooled to 70° C. at which temperature it was still molten. A solution of the diethyl sulfate in the remaining portion of 3,9-divinylspirobi (m-dioxane) was then added. The mixture was then reacted for a short time at 86° C. and was then poured into molds and cured for 16 hours at 150° C. Evaluation of the cured polymers gave these results:

| | |
|---|---:|
| Heat distortion ° C | 157 |
| Flexural modulus p.s.i. | 395,000 |
| Impact strength-izod (ft.-lbs. per in. of notch) | 0.2 |
| Hardness-Durometer "D" | 90 |

What is claimed is:

1. A resinous heat reaction product of from 0.25 to 4 equivalents of a bisphenol of the group consisting of a dihydroxydiphenylmethane and 2,2-bis-(p-hydroxyphenyl) propane with one equivalent of a 3,9-dialkenyl-spirobi(m-dioxane) having from 2 to 3 carbon atoms in the alkenyl radical and having the double bond of the alkenyl radical in the alpha position.

2. A resinous heat reaction product of from 0.25 to 4 equivalents of 2,2-bis-(p-hydroxyphenyl) propane and one equivalent of 3,9-divinylspirobi(m-dioxane).

3. A resinous heat reaction product of from 0.25 to 4 equivalents of 4,4'-dihydroxydiphenylmethane and one equivalent of 3,9-divinylspirobi(m-dioxane).

4. Process for making a thermoset resin product which comprises heating at a reaction temperature of 50° C. to 150° C. and in admixture with an acidic catalyst from 0.25 to 4 equivalents of a bisphenol of the group consisting of a dihydroxydiphenylmethane and 2,2-bis-(p-hydroxyphenyl) propane with one equivalent of a 3,9-alkenylspirobi(m-dioxane) having from 2 to 3 carbon atoms in the alkenyl radical and having the double bond of the alkenyl radical in the alpha position to form a fusible resin, and heating the fusible resin at a temperature higher than said reaction temperature to form a solid thermoset resin.

5. Process for making a thermoset resin product which comprises heating at a reaction temperature of 50° C. to 150° C. and in admixture with an acidic catalyst from 0.25 to 4 equivalents of 2,2-bis-(p-hydroxyphenyl) propane with one equivalent of 3,9-divinylspirobi(m-dioxane) to form a fusible resin, and heating the fusible resin at a temperature higher than said reaction temperature to form a solid thermoset resin.

6. A fusible, heat-hardenable composition of matter comprising the heat reaction product of from 0.25 to 4 equivalents of a bisphenol of the group consisting of a dihydroxydiphenylmethane and 2,2-bis-(p-hydroxyphenol) propane and one equivalent of a 3,9-dialkenylspirobi(m-dioxane) having from 2 to 3 carbon atoms in the alkenyl radical and having the double bond of the alkenyl radical in the alpha position, in combination with an acid catalyst.

7. A fusible, heat-hardenable composition of matter comprising the heat reaction product of from 0.75 to 1.25 equivalents of 2,2-bis-(p-hydroxyphenyl) propane and one equivalent of 3,9-divinylspirobi(m-dioxane), in combination with an acid catalyst.

References Cited in the file of this patent

UNITED STATES PATENTS

| 2,401,776 | Rothrock | June 11, 1946 |

FOREIGN PATENTS

| 868,351 | Germany | Feb. 23, 1953 |